Patented Oct. 16, 1951

2,571,712

UNITED STATES PATENT OFFICE 2,571,712

HERBICIDE SPRAYS

William J. Hanson and John M. Dunham, Long Beach, Calif., assignors to The Dow Chemical Company, Midland, Mich., a corporation of Delaware No Drawing. Application May 4, 1949,
Serial No. 91,416

3 Claims. (Cl. 71—2.6)

This invention relates to aqueous herbicide sprays and is particularly concerned with methods and concentrates for their production.

In recent years, dilute aqueous sprays containing the amine salts of 2,4,5-trichlorophenoxy-acetic acid have been employed for the killing of weeds. Such spray compositions have conveniently been prepared by diluting an aqueous concentrate of the amine salt with the water immediately available. In such operations, the aqueous concentrates containing as much as from 30 to 70 per cent by weight of the amine salt have been employed.

One of the difficulties encountered in the dilution of such concentrates has been the formation of water-insoluble aggregates. Thus, when the amine salt concentrates are mixed with hard water, insoluble flocculent precipitates are frequently formed. Such precipitates are dispersed throughout the spray and clog the nozzles and screens of conventional spraying equipment with such rapidity that at times the application of only small volumes of spray is possible before cleaning operations become necessary. The expense involved and time consumed in intermittent cleaning procedures have limited the use of the amine salts of 2,4,5-trichlorophenoxy-acetic acid in large growth control programs.

An object of this invention is the provision of aqueous herbicide sprays comprising the triethylamine salt of 2,4,5-trichlorophenoxy-acetic acid, which sprays are substantially free of water-insoluble constituents and are adapted to be employed in usual spraying equipment. An additional object is the provision of a concentrate for the production of such precipitate-free aqueous herbicide sprays. A further object is to provide a method for preventing the precipitation of water-insoluble aggregates in the production of aqueous sprays from concentrates comprising the triethylamine salt of 2,4,5-trichlorophenoxy-acetic acid. Other objects will become apparent from the following specification.

It has been discovered that when a small amount of water-soluble methyl cellulose is present in an aqueous spray comprising the triethylamine salt of 2,4,5-trichlorophenoxy-acetic acid and a water of usual hardness, the spray is substantially free of water-insoluble aggregates and may be employed with conventional spraying equipment without clogging nozzles and screens. The amount of methyl cellulose incorporated in the ultimate spray mixture depends upon the concentration of the triethylamine salt in the spray and the hardness of the water present in the composition. For example, satisfactory sprays have been obtained when the amount of methyl cellulose by weight of the amine salt progressively increases from 0.8 per cent where the amine salt concentration is 0.12 per cent, from 0.8 to 2 per cent when the amine salt concentration is 0.5 per cent, and from 0.8 to 10 per cent when the amine salt concentration is 2½ per cent. Roughly, this represents an amount of methyl cellulose of from 0.8 to 10 per cent by weight of the amine salt present in concentrates and sprays. In practice, good results have been obtained with sprays and concentrates containing a water-soluble methyl cellulose in the amount of at least 0.8 per cent by weight of the triethylamine salt present in the composition.

The water-soluble methyl cellulose employed is a white fibrous material, completely soluble in cold water and insoluble in most organic solvents. Its aqueous solutions are odorless, tasteless, non-toxic, neutral, stable to light, and not affected by changes in alkalinity or acidity over a wide pH range. The degree of methylation of this material is from 29 to 32 per cent. This methyl cellulose is a commercial product sold in different viscosity types. The products most advantageously employed in the methods and compositions herein disclosed, are characterized by viscosities of from 10 to 1500 centipoises in 2 per cent aqueous solution at 20° C. An aqueous solution of from 0.5 to 10 per cent of the methyl cellulose is a convenient form in which the latter may be employed, although the solid product can be used if desired.

In one aspect, this invention consists in an improved aqueous herbicide concentrate, comprising methyl cellulose and the triethylamine salt of 2,4,5-trichlorophenoxy-acetic acid, and a method for their preparation. Such concentrates are prepared by reacting 2,4,5-trichlorophenoxy-acetic acid with a quantity of triethylamine sufficient to neutralize the acid in the presence of water as solvent. The reaction takes place on contact at room temperature. In practice, triethylamine is first dissolved in the water and 2,4,5-trichlorophenoxy-acetic acid added portionwise with stirring. The desired amount of methyl cellulose or an aqueous solution of methyl cellulose is then added to the mixture. The resulting mixture is agitated to dissolve the methyl cellulose, and then diluted with water to form concentrates containing the amine salt in any desired concentration. The total amount of water employed is generally such as to provide a concentrate containing from 30–70 per cent by weight of the amine salt. This concentrate may then be further diluted with water to produce the ultimate spray mixture.

The invention also provides a method for the production of precipitate-free aqueous herbicide sprays from an existing aqueous concentrate comprising the triethylamine salt of 2,4,5-trichlorophenoxy-acetic acid. One such method is disclosed above. An alternative procedure consists in dispersing the methyl cellulose in the bulk of the water to be employed in the dilution of the existent amine salt concentrate.

The following examples illustrate the invention but are not to be construed as limiting.

Example 1

An aqueous solution of the triethylamine salt of 2,4,5-trichlorophenoxy-acetic acid was prepared by reacting substantially equimolecular proportions of triethylamine and 2,4,5-trichlorophenoxy-acetic acid in the presence of water at room temperature. The triethylamine was dissolved in water and the 2,4,5-trichlorophenoxy-acetic acid added portionwise with stirring until the pH of the resulting solution was 7.0. A 5 per cent aqueous solution of methyl cellulose (15 centipoises viscosity in 2 per cent by weight aqueous solution at 20° C.) was then added to the mixture in an amount equal to 0.86 per cent by weight of the triethylamine salt present. The resulting solution was stirred for a short period to disperse the methyl cellulose, and subsequently diluted with water to produce a concentrate containing 46.4 per cent by weight of the triethylamine salt.

In an exactly comparative operation, triethylamine and 2,4,5-trichlorophenoxy-acetic acid were reacted and diluted with water to produce a 46.4 per cent by weight amine salt concentrate. Methyl cellulose was not included in this mixture.

Portions of the two concentrates separately were diluted with water to produce sprays containing 2.2 pounds by weight of the triethylamine salt in 100 gallons of water. The water employed had a hardness of 322 parts per million, expressed as calcium carbonate. The sprays were thoroughly agitated and 50 milliliter portions placed in test tubes. After ⅓ hours standing, the bottom of the test tube containing the spray comprising the unmodified triethylamine salt solution was found covered with a flocculent precipitate. The spray comprising the amine salt and methyl cellulose was clear and almost entirely free of precipitate.

Example 2

In a manner similar to that of Example 1, aqueous sprays were produced both with and without the stabilizing methyl cellulose and from water of various hardness. The methyl cellulose employed had a viscosity of 15 centipoises in 2 per cent aqueous solution and at 20° C. Fifty milliliter portions of each spray were immediately placed in vials having an inside diameter of ¾ inches, and the vials set aside to permit sedimentation of any insoluble materials. About 72 hours later, observations were carried out to ascertain the appearance of the solution and the presence or absence of precipitates, which are recorded in the following table:

| Hardness of Water Expressed as Parts Per Million of Calcium Carbonate | Pounds of Amine Salt Per 100 Gallons of Spray Mixture | Amount of Methyl Cellulose in Per Cent by Weight of the Amine Salt in the Spray | Amount of Precipitate After 72 Hours |
|---|---|---|---|
|  |  |  | Millimeters |
| 200 | 2.2 | 0.86 | none |
| 200 | 4.4 | 0.86 | 1 |
| 200 | 8.8 | 0.86 | 1 |
| 200 | 2.2 | none | 9 |
| 400 | 1.1 | 0.86 | 2 |
| 400 | 2.2 | 0.86 | 2 |
| 400 | 4.4 | 0.86 | 4 |
| 400 | 2.2 | none | 20 |
| 800 | 1.1 | 0.86 | 3 |
| 800 | 1.1 | 3.2 | 2 |
| 800 | 1.1 | 5.6 | ½ |
| 800 | 2.2 | 0.86 | 6 |
| 800 | 2.2 | 3.2 | 5 |
| 800 | 2.2 | 5.6 | 3 |
| 800 | 2.2 | none | 21 |
| 800 | 4.4 | 0.86 | 9 |
| 800 | 4.4 | 3.2 | 9 |
| 1,200 | 1.1 | 0.86 | 5 |
| 1,200 | 2.2 | 0.86 | 8 |
| 1,200 | 2.2 | none | 23 |

Example 3

Aqueous sprays were prepared as described in Example 1 from water having a hardness of 322 parts per million expressed as calcium carbonate and from various viscosity grades of methyl cellulose. Each spray contained 4.4 pounds of the triethylamine salt of 2,4,5-trichlorophenoxy-acetic acid and 0.037 pound of methy cellulose per 100 gallons of solution. This amount of methyl cellulose was equal to 0.86 per cent by weight of the amine salt present. 50 milliliter portions of each spray were placed in vials having an inside diameter of ¾ inch, and the vials set aside to permit sedimentation of insoluble materials. About 72 hours later, observations were carried out to ascertain the presence or absence of precipitates, which are recorded in the following table:

| Pounds of Amine Salt Per 100 Gallons of Spray Mixture | Amount of Methyl Cellulose in Per Cent by Weight of the Amine Salt in the Spray | Viscosity of the Methyl Cellulose in 2 Per Cent by Weight Aqueous Solution at 20° C. Expressed in Centipoises | Amount of Precipitate After 72 Hours |
|---|---|---|---|
|  |  |  | Millimeters |
| 4.4 | 0.86 | 15 | ½ |
| 4.4 | 0.86 | 25 | ½ |
| 4.4 | 0.86 | 400 | ½ |
| 4.4 | 0.86 | 1,500 | ½ |
| 4.4 | none | none | 22 |

We claim:

1. An aqueous herbicide spray composition comprising the triethylamine salt of 2,4,5-trichlorophenoxy-acetic acid as a principal toxic ingredient and a water-soluble methyl cellulose in the amount of at least 0.8 per cent by weight of the amine salt present in the composition.

2. An aqueous herbicide spray composition as defined in claim 1 wherein the methyl cellulose is characterized by a viscosity of from 10 to 1500 centipoises in 2 per cent by weight aqueous solution and at 20° C.

3. A herbicide concentrate comprising an aqueous solution of the triethylamine salt of 2,4,5-trichlorophenoxy-acetic acid, and a water-soluble methyl cellulose in the amount of at least 0.8 per cent by weight of the amine salt present in the concentrate.

WILLIAM J. HANSON.
JOHN M. DUNHAM.

REFERENCES CITED

The following references are of record in the file of this patent:

UNITED STATES PATENTS

| Number | Name | Date |
|---|---|---|
| 1,719,944 | Risse | July 9, 1929 |
| 2,216,045 | Powers | Sept. 24, 1940 |
| 2,390,941 | Jones | Dec. 11, 1945 |
| 2,416,460 | Smith | Feb. 25, 1947 |
| 2,515,198 | Dosser et al. | July 18, 1950 |

OTHER REFERENCES

Science, July 1947, page 87.

Amer. Prof. Pharmacist, December 1939, page 692.

Botanical Gazette, 105 (1944), pages 474–483.